(12) United States Patent
Min

(10) Patent No.: US 10,540,958 B2
(45) Date of Patent: Jan. 21, 2020

(54) NEURAL NETWORK TRAINING METHOD AND APPARATUS USING EXPERIENCE REPLAY SETS FOR RECOGNITION

(71) Applicant: SAMSUNG ELECTRONICS CO., LTD., Suwon-si (KR)

(72) Inventor: Yunhong Min, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 14 days.

(21) Appl. No.: 15/678,390

(22) Filed: Aug. 16, 2017

(65) Prior Publication Data

US 2018/0277098 A1 Sep. 27, 2018

(30) Foreign Application Priority Data

Mar. 23, 2017 (KR) .......................... 10-2017-0036909

(51) Int. Cl.
| | | |
|---|---|---|
| *G10L 15/06* | (2013.01) | |
| *G06N 3/08* | (2006.01) | |
| *G10L 15/16* | (2006.01) | |
| *G10L 25/30* | (2013.01) | |
| *G06K 9/62* | (2006.01) | |
| *G10L 15/02* | (2006.01) | |
| *G10L 15/14* | (2006.01) | |

(52) U.S. Cl.
CPC .............. *G10L 15/063* (2013.01); *G06N 3/08* (2013.01); *G10L 15/02* (2013.01); *G10L 15/14* (2013.01); *G10L 15/16* (2013.01); *G10L 25/30* (2013.01); *G10L 2015/022* (2013.01); *G10L 2015/0635* (2013.01)

(58) Field of Classification Search
CPC .......... G10L 15/063; G10L 2015/0635; G10L 2015/0636; G10L 15/16; G10L 25/30; G06N 99/005; G06N 3/084; G06K 9/6262
USPC ...................... 704/232, 243–244; 706/16, 20
See application file for complete search history.

(56) References Cited

U.S. PATENT DOCUMENTS

| | | | | |
|---|---|---|---|---|
| 7,245,250 | B1 * | 7/2007 | Kalayeh | G01S 13/9011 342/189 |
| 7,624,079 | B2 * | 11/2009 | Hartman | G05B 13/027 704/226 |
| 9,202,464 | B1 | 12/2015 | Senior et al. | |
| 2004/0249480 | A1 * | 12/2004 | Lefebvre | G05B 7/02 700/31 |
| 2005/0049855 | A1 * | 3/2005 | Chong-White | G10L 19/173 704/219 |
| 2005/0089216 | A1 | 4/2005 | Schiller et al. | |

(Continued)

OTHER PUBLICATIONS

Anschel, Oron, et al. "Averaged-dqn: Variance reduction and stabilization for deep reinforcement learning." arXiv preprint arXiv: 1611.01929, Mar. 2017, pp. 1-13. (Year: 2017).*

(Continued)

*Primary Examiner* — James S Wozniak
(74) *Attorney, Agent, or Firm* — NSIP Law

(57) ABSTRACT

A training method and apparatus for speech recognition is disclosed, where an example of the training method includes determining whether a current iteration for training a neural network is performed by an experience replay iteration using an experience replay set, selecting a sample from at least one of the experience replay set and a training set based on a result of the determining, and training the neural network based on the selected sample.

31 Claims, 6 Drawing Sheets

(56) References Cited

U.S. PATENT DOCUMENTS

| | | | |
|---|---|---|---|
| 2010/0211536 A1* | 8/2010 | Al-Fattah | E21B 49/00 706/21 |
| 2013/0006612 A1 | 1/2013 | Xu et al. | |
| 2013/0090926 A1 | 4/2013 | Grokop et al. | |
| 2013/0246322 A1 | 9/2013 | De Sousa Webber | |
| 2015/0019214 A1* | 1/2015 | Wang | G10L 15/34 704/232 |
| 2015/0100530 A1* | 4/2015 | Mnih | G06N 3/0454 706/25 |
| 2015/0242747 A1* | 8/2015 | Packes | G06N 3/0454 706/17 |
| 2016/0027452 A1 | 1/2016 | Kalinli-Akbacak et al. | |
| 2016/0078339 A1* | 3/2016 | Li | G06N 3/084 706/20 |
| 2016/0131750 A1* | 5/2016 | Lu | G01S 11/06 342/458 |
| 2016/0174902 A1* | 6/2016 | Georgescu | G06T 7/73 600/408 |
| 2016/0232445 A1* | 8/2016 | Srinivasan | G06N 3/0472 |
| 2016/0328661 A1* | 11/2016 | Reese | G06N 99/005 |
| 2016/0358043 A1* | 12/2016 | Mu | G06K 9/66 |
| 2017/0024643 A1* | 1/2017 | Lillicrap | G06N 3/08 |
| 2017/0116497 A1* | 4/2017 | Georgescu | A61B 6/032 |
| 2017/0140269 A1* | 5/2017 | Schaul | G06N 3/08 |
| 2017/0148429 A1* | 5/2017 | Hayakawa | G10L 15/02 |
| 2017/0228659 A1* | 8/2017 | Lin | G06N 99/005 |
| 2017/0263147 A1* | 9/2017 | King | G09B 5/02 |
| 2018/0052825 A1* | 2/2018 | Lipton | G06F 17/279 |
| 2018/0144245 A1* | 5/2018 | Simard | G06F 17/153 |
| 2019/0061147 A1* | 2/2019 | Luciw | G06N 3/008 |

OTHER PUBLICATIONS

Coors, Benjamin. "Navigation of Mobile Robots in Human Environments with Deep Reinforcement Learning." Master's Thesis, Jun. 2016, pp. 1-59. (Year: 2016).*

Fan, Yang, et al. "Learning What Data to Learn." arXiv preprint arXiv:1702.08635, Feb. 2017, pp. 1-10. (Year: 2017).*

Fan, Yang, et al. "Neural Data Filter for Bootstrapping Stochastic Gradient Descent." Nov. 2016, pp. 1-13. (Year: 2016).*

Fu, Jie, et al. "Deep Q-networks for accelerating the training of deep neural networks." arXiv preprint arXiv:1606.01467, Aug. 2016, pp. 1-11. (Year: 2016).*

Jaitly, Navdeep, et al. "An online sequence-to-sequence model using partial conditioning." Advances in Neural Information Processing Systems. Dec. 2016, pp. 5607-5075. (Year: 2016).*

Kumar, M. Pawan, Benjamin Packer, and Daphne Koller. "Self-paced learning for latent variable models." Advances in Neural Information Processing Systems. Dec. 2010, pp. 1189-1197. (Year: 2010).*

Gabel, Thomas, et al. "Multi-agent case-based reasoning for cooperative reinforcement learners." European Conference on Case-Based Reasoning. Springer, Berlin, Heidelberg, Sep. 2006, pp. 32-46. (Year: 2006).*

Schaul, Tom, et al. "Prioritized experience replay." arXiv preprint arXiv:1511.05952, Feb. 2016, pp. 1-21. (Year: 2016).*

Seijen, Harm van, et al. "Exploiting best-match equations for efficient reinforcement learning." Journal of Machine Learning Research, Jun. 2011, pp. 2045-2094. (Year: 2011).*

Lin, Long-Ji., "Self-Improving Reactive Agents Based on Reinforcement Learning, Planning and Teaching." *Machine learning*, vol. 8, 3-4, 1992 (pp. 293-321).

Loshchilov, Ilya et al., "Online Batch Selection for Faster Training of Neural Networks." arXiv preprint arXiv:1511.06343, 2015 (pp. 1-20).

Fan, Yang, et al., "Learning What Data to Learn." arXiv preprint arXiv:1702.08635, 2017 (pp. 1-10).

Extended European Search report dated May 29, 2018 in corresponding European Patent Application No. 17200655.3 (7 pages in English).

* cited by examiner

NEURAL NETWORK TRAINING METHOD AND APPARATUS USING EXPERIENCE REPLAY SETS FOR RECOGNITION

CROSS-REFERENCE TO RELATED APPLICATION(S)

This application claims the benefit under 35 USC § 119(a) of Korean Patent Application No. 10-2017-0036909 filed on Mar. 23, 2017, in the Korean Intellectual Property Office, the entire disclosure of which is incorporated herein by reference for all purposes.

BACKGROUND

1. Field

The following description relates to a training technology for speech recognition.

2. Description of Related Art

An acoustic model used in a speech recognition apparatus could be implemented in a hybrid form of a hidden Markov model (HMM) and a Gaussian mixture model (GMM). Recently deep learning schemes are being commercialized that mainly uses an acoustic model based on a neural network.

Various schemes have been proposed for training an acoustic model based on a neural network. The speed at which an acoustic model learns, i.e., its learning speed is the speed at which the initial untrained acoustic model becomes fully trained. A training scheme for increasing the learning speed and enhancing training efficiency and accuracy may be required.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a training method including determining whether a current iteration for training a neural network is performed by an experience replay iteration using an experience replay set, selecting a sample from at least one of the experience replay set and a training set based on a result of the determining, and training the neural network based on the selected sample.

The determining may include determining whether an iteration number corresponding to the current iteration is a multiple of a first number.

The determining may include determining whether an iteration number corresponding to the current iteration is less than a sum of a multiple of a first number and a second number.

The determining may include determining whether a training error reduction corresponding to an iteration prior to the current iteration is less than or equal to a threshold.

The determining may include determining whether the current iteration is performed using a batch scheme.

The selecting may include randomly selecting the sample from the experience replay set in response to the current iteration being performed by the experience replay iteration.

The selecting may include randomly selecting a first sample from the training set in response to the current iteration being performed by the experience replay iteration, and selecting a second sample that is substantially similar to the randomly selected first sample from the experience replay set.

The similarity may be defined based on a distribution of triphones of a speech sample.

The selecting may include selecting a sample from the experience replay set based on qualities of samples in the experience replay set in response to the current iteration being performed by the experience replay iteration.

The selecting may include randomly selecting samples from the experience replay set in response to the current iteration being performed by the experience replay iteration and the experience replay iteration being performed using a batch scheme.

The selecting may include randomly selecting samples at a ratio from the experience replay set and the training set in response to the current iteration being performed by the experience replay iteration and the experience replay iteration being performed using a batch scheme.

The selecting may include randomly selecting first samples from the training set in response to the current iteration being performed by the experience replay iteration and the experience replay iteration being performed using a batch scheme, and selecting second samples that are substantially similar the randomly selected first samples from the experience replay set.

The selecting may include selecting samples from the experience replay set based on qualities of samples in the experience replay set, in response to the current iteration being performed by the experience replay iteration and the experience replay iteration being performed using a batch scheme.

The training method may include determining whether to update the experience replay set based on a result of the training and the selected sample.

The determining of whether to update the experience replay may include calculating a quality of the selected sample based any one or any combination of a probability of the selected sample in a distribution of samples included in the experience replay set, an output obtained from the neural network trained based on the selected sample, a training error reduction corresponding to the current iteration, and a difference between a training error reduction corresponding to an iteration prior to the current iteration and the training error reduction corresponding to the current iteration.

The determining of whether the experience replay set is to be updated may include comparing the calculated quality to qualities of the samples in the experience replay set.

The training method may include replacing at least one sample corresponding to a quality lower than the calculated quality with the selected sample based on a result of the comparing.

The determining of whether the experience replay set is to be updated may include comparing the calculated quality to a threshold value.

The training method may include adding the selected sample to the experience replay set based on a result of the comparing.

The threshold value may decrease as an iteration number of the current iteration increases, in response to the quality being calculated based on the difference.

The threshold value may increase as an iteration number of the current iteration increases, in response to the quality being calculated based on the output.

The experience replay set may include at least one of speech samples recorded in an environment or speech samples corresponding to triphones uniformly distributed based on a reference.

In another general aspect, there is provided a training method including training a neural network based on a sample selected from at least one of an experience replay set or a training set in association with a current iteration for training the neural network, determining whether to update the experience replay set based on a result of the training and the selected sample, and updating the experience replay set based on a result of the determining.

The determining of whether to update the experience replay set may include calculating a quality of the selected sample based on any one or any combination of a probability of the selected sample in a distribution of samples included in the experience replay set, an output obtained from the neural network trained based on the selected sample, a training error reduction corresponding to the current iteration, and a difference between a training error reduction corresponding to an iteration prior to the current iteration and the training error reduction corresponding to the current iteration.

The determining of whether to update the experience replay set may include comparing the calculated quality to qualities of the samples in the experience replay set, and the updating further may include replacing at least one sample corresponding to a quality lower than the calculated quality with the selected sample based on a result of the comparing.

The determining may include comparing the calculated quality to a threshold value, and the updating further may include adding the selected sample to the experience replay set based on a result of the comparing.

The threshold value may decrease as an iteration number of the current iteration increases, in response to the quality being calculated based on the difference.

The threshold value may increase as an iteration number of the current iteration increases, in response to the quality being calculated based on the output.

The training may include determining whether the current iteration is performed by an experience replay iteration using the experience replay set.

In another general aspect, there is provided a training apparatus including a processor configured to determine whether a current iteration for training a neural network is performed by an experience replay iteration using an experience replay set, to select a sample from at least one of the experience replay set or a training set based on a result of the determining, and to train the neural network based on the selected sample.

In another general aspect, there is provided a training apparatus including a processor configured to train a neural network based on a sample selected from at least one of an experience replay set or a training set in association with a current iteration for training the neural network, to determine whether to update the experience replay set based on a result of the training and the selected sample, and to update the experience replay set based on a result of the determining.

Other features and aspects will be apparent from the following detailed description, the drawings, and the claims.

Figure 1:
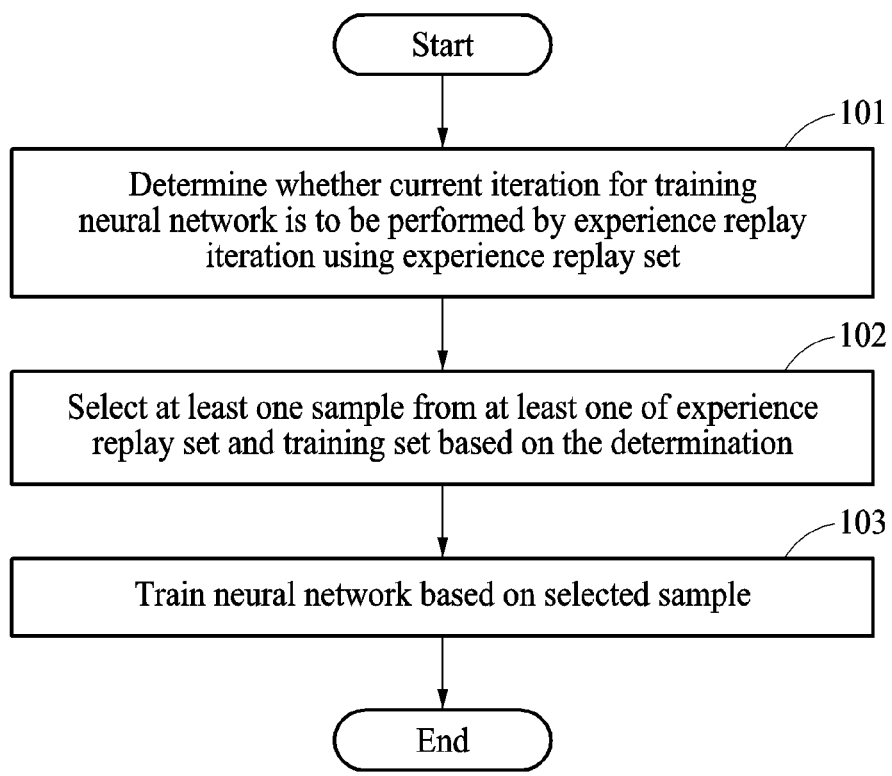
FIG. 1 is a diagram illustrating an example of a training method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after gaining a thorough understanding of the disclosure of this application. For example, the sequences of operations described herein are merely examples, and are not limited to those set forth herein, but may be changed as will be apparent to one of ordinary skill in the art, with the exception of operations necessarily occurring in a certain order. Also, descriptions of functions and constructions that are known in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise.

When describing the examples with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here.

Figure 2:
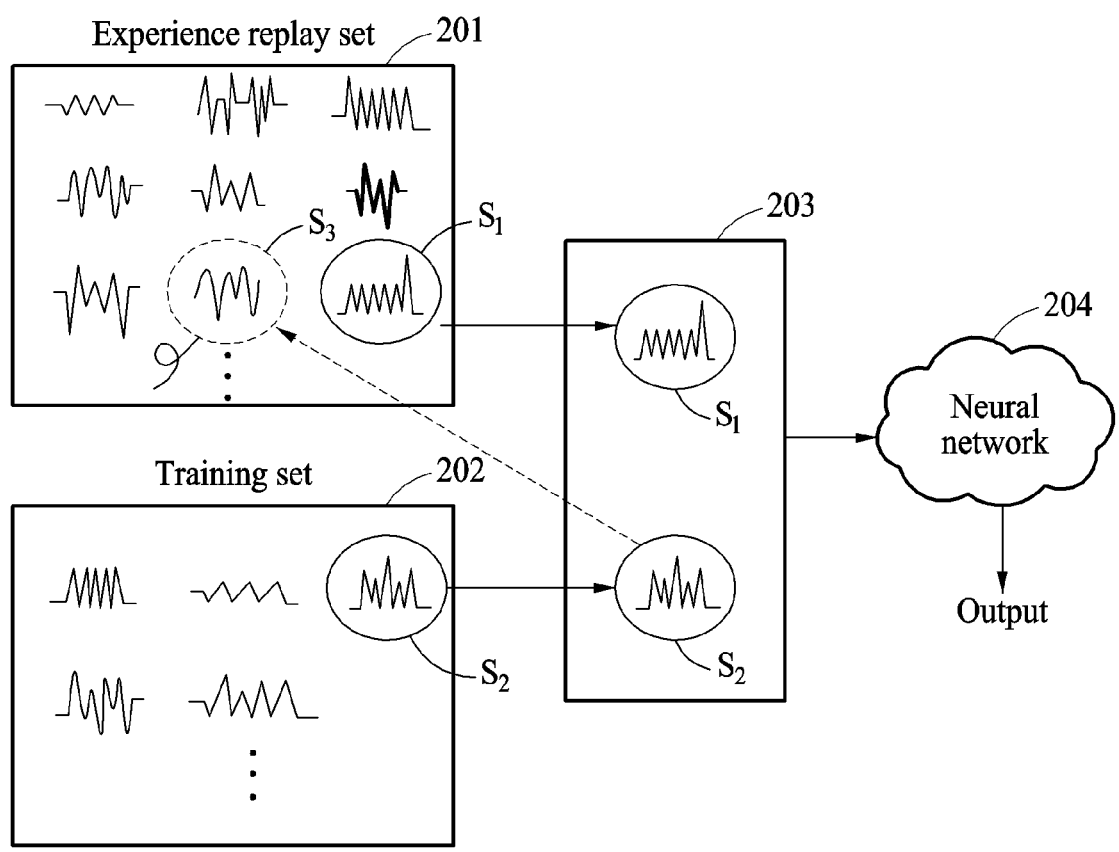
FIG. 2 is a diagram illustrating an example of a training method.

FIG. 1 is a diagram illustrating an example of a training method. The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently. One or more blocks of FIG. 1, and combinations of the blocks, can be implemented by special purpose hardware-based computer that perform the specified functions, or combinations of special purpose hardware and computer instructions. In addition to the description of FIG. 3 below, the descriptions of FIGS. 1-2 is also applicable to FIG. 3, and are incorporated herein by reference. Thus, the above description may not be repeated here.

Referring to FIG. 1, in operation 101, a training apparatus determines whether a current iteration for training a neural network is to be performed by an experience replay iteration performed using an experience replay set. The training apparatus is an apparatus for training a recognizer. In an example, the training apparatus trains an acoustic model, a language model, or an end-to-end speech recognition model used when a speech recognition apparatus is built. The acoustic model is used in automatic speech recognition (ASR) and processes a relationship between a speech signal feature and a language element. For example, the training apparatus estimates pronunciation of a speech signal. A language model differentiated from the acoustic model may estimate a degree that a word or a sentence is grammatically or semantically accurate. The speech recognition apparatus may be implemented in a form in which the acoustic model and the language model are combined. In an example, the end-to-end speech recognition model may be implemented in a form in which a word or a sentence is directly estimated from a speech signal by combining the acoustic model and the language model in the speech recognition apparatus.

The acoustic model may be adopted in a server or various types of apparatuses, such as, for example, an intelligent agent, a mobile phone, a cellular phone, a smart phone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, a smart television (TV), a high definition television (HDTV), a smart appliance, an optical disc player, a DVD player, a Blue-ray player, a setup box, robot cleaners, a home appliance, a smart appliance, content players, communication systems, image processing systems, graphics processing systems, other consumer electronics/information technology (CE/IT) device, various Internet of Things (IoT) devices that are controlled through a network, a smart vehicle, an intelligent automobile, an autonomous driving vehicle, or any other device capable of wireless communication or network communication consistent with that disclosed herein.

An acoustic model designed based on deep learning may be trained using a plurality of samples. For example, an acoustic model based on a neural network is trained by a plurality of speech signals, acoustic features, and phones or senones for each frame. However, examples of the training method are not limited to a speech recognition apparatus or a neural network based recognizer. The examples may be employed and applied to various types of models or apparatuses.

In an example, the training apparatus performs a plurality of iterations for training the neural network, and perform at least a portion of the iterations based on an experience replay iteration. In an example, the training apparatus inputs samples to the neural network to be trained, and iteratively updates the neural network. For example, the training apparatus trains a neural network using a scheme for optimizing weights between nodes included in the neural network.

An iteration is any one of iterations performed by training. In an example, an iteration indicates an operation of updating or optimizing a neural network using at least one sample among operations of iteratively updating or optimizing the neural network. The training apparatus may perform a first iteration using at least one first sample, and perform a second iteration using at least one second sample after the first iteration is complete. The training apparatus may perform iterations and train the neural network by completing all iterations. An iteration number may be variously defined based on design intent. For example, an iteration number is defined based on a number defined in advance, a condition, a number of samples, a training error corresponding to an iteration, and a difference between a training error corresponding to a previous iteration and a training error corresponding to a current iteration. However, the iteration number is not limited thereto, and various references or policies may be employed.

The experience replay iteration indicates an iteration performed based on the experience replay set among the iterations. The training apparatus may perform the iterations for training using a plurality of samples. A portion of the samples may be separately managed and the experience replay set may be used when the experience replay iteration is performed. In an example, the training apparatus selects and stores at least one sample useful for training from among the samples used for training, and provides the experience replay set using the stored samples. The experience replay set may be a set of samples that are separately managed for performing the experience replay iteration.

A sample corresponding to data for training the acoustic model is referred to as a training sample. The sample may be implemented in various forms, such as, for example, a speech signal, data obtained by preprocessing the speech signal, a feature or a feature vector of the speech signal, and a phone or a senone for each frame of the speech signal. However, the examples do not limit a type of the sample. The sample of the speech signal may be defined or designed in various forms based on a word, a phoneme, a morpheme, a phonetic sign unit, a phrase, a clause, a sentence, and a paragraph, and the examples do not limit a type of information implied by the sample.

In an example, the training apparatus copies a training model by replaying an experience and applying the training model to machine training. In an example, the training model is one of models of a human learning process in neuroscience and cognitive science. As described above, the training apparatus enhances a speed and accuracy of training by separately managing samples determined to be useful for training as the experience replay set, and regularly or irregularly adopting the experience replay set in a training process.

In an example, the training apparatus determines whether at least one iteration is to be performed by the experience replay iteration before the iterations for training are performed, or determine whether each iteration is to be performed by the experience replay iteration before each iteration is performed. Detailed description about whether a current iteration is to be performed by the experience replay iteration is provided with reference to FIG. 3.

In operation 102, the training apparatus selects a sample based on the determination. For example, the training apparatus selects one or more samples from the experience replay set or a training set. The training apparatus may select one or more samples or from the experience replay set, or select one or more samples from the training set.

In operation 103, the training apparatus trains the neural network based on the selected sample. For example, the training apparatus may perform the experience replay iteration using the experience replay set. In an example, the samples used for training include samples from the experience replay set and samples from the training set. In an example, the training set is a set of samples excluding samples included in the experience replay set among all samples. The training apparatus includes at least one sample to be input to the neural network in order to perform the experience replay iteration. The one or more sample to be input to the neural network may include at least one sample included in the experience replay set. Thus, the experience replay iteration may indicate an iteration performed by including a sample included in the experience replay set to the at least one sample to be input to the neural network.

In an example, the training apparatus determines whether the experience replay set is to be updated, and updates the experience replay set. For example, the training apparatus updates the experience replay set when performing the iterations for training, and subsequently performs the iterations using the updated experience replay set. Detailed description about an update of the experience replay is provided below.

FIG. 2 is a diagram illustrating an example of a training method. Referring to FIG. 2, a training apparatus trains a neural network 204 using at least one of samples included in an experience replay set 201 and a training set 202.

In an example, the training apparatus selects one or more sample from at least one of the experience replay set 201 and the training set 202 based determining whether a current iteration is to be performed by an experience replay iteration. When the current iteration corresponds to the experience replay iteration as described above, the training apparatus selects at least one sample from the experience replay set 201 when a sample for the current iteration is selected from among all samples. For example, the training apparatus selects a sample $S_1$ from the experience replay set 201 when the experience replay iteration is performed.

In an example, the training apparatus includes a plurality of samples to be input to the neural network 204 when the current iteration is performed. A scheme for performing a single iteration using a plurality of samples is referred to as a batch scheme. In an example, the training apparatus determines whether the current iteration is performed using the batch scheme. When the current iteration is performed using the batch scheme, the training apparatus generates a batch 203 being a set of samples to be input to the neural network 204. The training apparatus may generate the batch 203 using one sample or at least one sample selected from the experience replay set 201 and/or the training set 203.

In an example, the training apparatus adaptively selects at least one sample to be input to the neural network 204 from among all samples based on whether the current iteration corresponds to the experience replay iteration and whether the current iteration is performed using the batch scheme.

For example, in response to the current iteration corresponding to the experience replay iteration and being performed using the batch scheme, the training apparatus generates the batch 203 only using samples selected from the experience replay set 201. Also, the training apparatus generates the batch 203 using the samples selected from the experience replay set 201 and the samples selected from the training set 202.

In response to the current iteration corresponding to the experience replay iteration and being performed without using the batch scheme, the training apparatus selects a single sample to be input to the neural network 203 from the experience replay set 201.

In response to the current iteration not corresponding to the experience replay iteration and being performed using the batch scheme, the training apparatus generates the batch 203 only using the samples selected from the training set 202. Also, in response to the current iteration not corresponding to the experience replay iteration and being performed without using the batch scheme, the training apparatus selects any one sample from the training set 202.

In an example, the training apparatus trains the neural network 204 based on at least one sample selected from the experience replay set 201 or the training set 202. In an example, the training apparatus trains a neural network by adopting various types of schemes when a current iteration is performed. For example, the training apparatus trains a neural network using a stochastic gradient descent (SGD) scheme, and trains the neural network in a batch unit being a single sample or a set of samples when the SGD scheme is used.

In an example, when a single sample is used, the training apparatus uses the SGD scheme based on an output of the neural network 203 and a label of the sample.

In an example, when the batch scheme is used, the training apparatus uses the SGD scheme based on outputs of the neural network 204 and a label corresponding to a batch or labels of samples. In an example, the SGD scheme uses outputs corresponding to a batch, and a mini-batch SGD scheme may be employed for the SGD scheme. The training apparatus trains the neural network 204 based on the batch 203 including the selected samples $S_1$ and $S_2$. The training apparatus may use a loss function modified based on a plurality of outputs and a plurality of labels. A loss function used when the batch scheme is used may be applied in a variety of ways based on design choice, and may be modified based on a label in a batch unit and an output in a batch unit.

For example, the training apparatus inputs the samples $S_1$ and $S_2$ included in the batch 203 to the neural network 204, and calculates a training error based on the outputs of the neural network 204 and labels of the samples $S_1$ and $S_2$. The training apparatus may calculate the training error using a loss function. In an example, the loss function is predefined. The loss function may be predefined using a label, an output, and a parameter as input variances. Here, the parameter may be set by weights in the neural network 204. For example, the loss function may be modified in a mean square error (MSE) form and an entropy form. Various schemes and methods may be used for examples of modification of the loss function.

In an example, the training apparatus determines whether the experience replay set 201 is to be updated based on a result of the training and the selected sample. The training apparatus determines whether the experience replay set 201 is to be updated before the current iteration is complete. An update of the experience replay set 201 indicates an update of combination of the samples included in the experience replay set 201. For example, the training apparatus replaces the samples included in the experience replay set 201 with new samples, or adds the new samples to the experience replay set 201. For example, the training apparatus replaces a sample $S_3$ in the experience set 201 with the sample $S_2$ among the samples $S_1$ and $S_2$ based on the result of training of the experience replay iteration corresponding to the current iteration. In an example, the training apparatus compares a quality of the sample $S_2$ to a quality of the sample $S_3$ or compares the quality of the sample $S_2$ to a threshold value, and replaces the sample $S_3$ with the sample $S_2$ based on the comparision.

In an example, the training apparatus maintains the sample $S_1$ to be included in the experience replay set 201. In an example, the training apparatus excludes the sample $S_1$ from the experience replay set 201 by selecting the sample $S_1$ from the experience replay set 201, and determines whether the sample $S_1$ is to be added to the experience replay set 201 again based on the result of the training. In an example, the training apparatus maintains the sample $S_1$ to be included in the experience replay set 201 by selecting the sample $S_1$, and determine whether to maintain the sample $S_1$ to be included in the experience replay set 201 or whether to exclude the sample $S_1$ from the experience replay set 201 based on the result of the training. Whether to exclude, from the experience replay set 201, a sample selected from the experience replay set 201 at a point in time at which a corresponding iteration is performed may be set based on design intent. In an example, the training apparatus updates the experience replay set 201 based on a quality of a sample. Detailed description of a condition, a reference, a method, or a policy for updating the experience replay set 201 is provided below.

The training apparatus updates the experience replay set 201 based on a result of determining of whether the experience replay set 201 is to be updated. Based on the determining that the experience replay set 201 is to be updated, the training apparatus updates the experience replay set 201 based on at least one sample and a quality of the sample used for the current iteration. Detailed description of the update of the experience replay set 201 and the quality of the sample is provided below.

Figure 3:
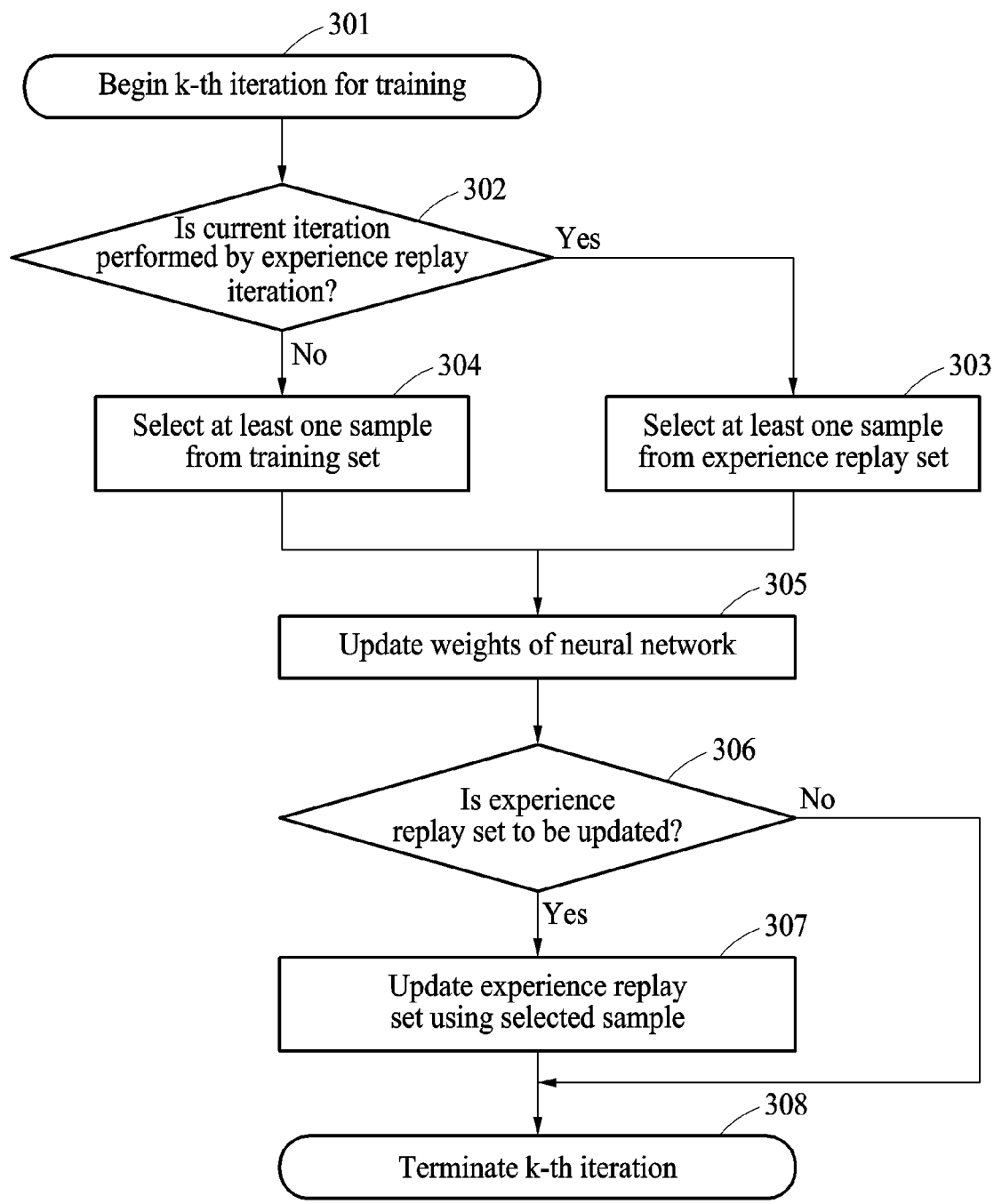
FIG. 3 is a diagram illustrating an example of a training process of a current iteration.

FIG. 3 is a diagram illustrating an example of a training process of a current iteration. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, the descriptions of FIGS. 1-2 is also applicable to FIG. 3, and are incorporated herein by reference. Thus, the above description may not be repeated here.

Referring to FIG. 3, in operation 301, a training apparatus initiates a k-th iteration for training. Here, "k-th" indicates an order or an iteration number of the current iteration among iterations performed by the training apparatus.

In operation 302, the training apparatus determines whether the current iteration is performed by an experience replay iteration. In an example, the training apparatus determines whether an iteration number corresponding to the current iteration among the iterations for training is a multiple of a particular number. For example, the training apparatus iteratively performs, as the experience replay iteration, an iteration of which an iteration number is a multiple of a predefined M among the iterations for training. In this example, the training apparatus determines whether k is a multiple of the predefined M, and determines whether the experience replay iteration is to be performed based on the determination.

In an example, the training apparatus determines whether the iteration number corresponding to the current iteration among the iterations for training is less than a sum of a multiple of a first number and a second number. For example, the training apparatus performs, as the experience replay iteration, an iteration of which the iteration number is a multiple of M among the iterations for training, and additionally performs the experience replay iteration N times after performing the experience replay iteration corresponding to the iteration number being the multiple of M. In this example, the training apparatus determines whether k is less than or equal to a sum of a multiple of M and N.

In an example, the training apparatus determines whether a training error reduction corresponding to an iteration before the current iteration is less than or equal to a threshold value. As described above, the training apparatus measures or calculates a reduction degree of the training error in a neural network by performing a predetermined iteration using a stochastic gradient descent (SGD) scheme. The training apparatus may calculate training errors corresponding to iterations or training error reductions, and record the calculated or measured training error reductions by mapping the values to the iterations. In an example, the training apparatus determines that a k-th iteration is performed by the experience replay iteration when a training error reduction corresponding to a (k−1)-th iteration being less than or equal to the threshold value. The determination of whether the experience replay iteration is to be performed based on the training error reduction corresponding to the previous iteration is only a non-exhaustive illustrations, and other factors for determining whether experience replay iteration is to be performed are considered to be well within the scope of the present disclosure. For example, the training apparatus may determine whether the experience replay iteration is to be performed based on training error reductions corresponding to previous iterations, change amounts of the training error reductions, or the training errors. The training apparatus generates a parameter based on the training errors corresponding to the previous iterations, and determines whether the experience replay iteration is to be performed based on the parameter. Various methods may be used and applied to an example of variances used to determine whether the experience replay iteration is to be performed according to design intent.

In an example, the training apparatus determines whether the current iteration is performed using a batch scheme. As described above, the training apparatus may use a set of samples for performing an iteration, and determine whether the current iteration is to be performed using a batch being the set of the samples. In an example, the training apparatus determines whether a k-th iteration is performed using the SGD scheme based on the batch scheme, and determines that the k-th iteration is performed by the experience replay iteration in response to the batch scheme being used. In an example, the training apparatus determines whether the k-th iteration is performed using the batch scheme based on a schedule, and adaptively determine whether the k-th iteration is performed using the batch scheme based on training results corresponding to previous iterations or parameters generated by the previous iterations. The training apparatus may perform, by policy, the experience replay iteration when the current iteration is performed using the batch scheme.

In operation 303, the training apparatus selects at least one sample from an experience replay set when the current iteration is performed by the experience replay iteration. As described above, when the experience replay iteration is performed using the batch scheme, the training apparatus selects a plurality of samples for the experience replay iteration. In response to the experience replay iteration being performed without using the batch scheme, the training apparatus selects the samples for the experience replay iteration from the experience replay set.

In an example, the training apparatus randomly selects any one sample from the experience replay set. For example, the training apparatus performs the SGD scheme using any one sample randomly selected from the experience replay set when the experience replay iteration corresponding to the current iteration is performed using the SGD scheme.

In an example, the training apparatus selects, from the experience replay set, a sample similar to any one sample selected from a training set. For example, the training apparatus randomly selects any one first sample from the training set when the experience replay iteration corresponding to the current iteration is performed using the SGD scheme. The training apparatus may select a second sample having a greatest similarity with the randomly selected first sample from the experience replay set. In an example, the similarity may be defined based on a measure to be used to classify samples, such as, for example, the similarity is defined based on a distribution of triphones of a speech sample. When a neural network to be trained is an acoustic model, the training apparatus may adopt speech samples or speech signals as samples. The training apparatus may define a function indicating a similarity between speech signals based on the distribution of triphones representing a distribution of phonetic signs, and use the function as a reference for determining a similarity between the samples. However, the similarity is not limited thereto. The similarity may be defined in various ways using various schemes and references according to design intent.

In an example, the training apparatus selects any one sample from the experience replay set based on qualities of the samples included in the experience replay set. For example, the training apparatus selects a sample having a highest quality from among the samples included in the experience replay set when the experience replay iteration corresponding to the current iteration is performed using the SGD scheme. In an example, the training apparatus selects a sample satisfying a reference from among the samples included in the experience replay set, or select a sample from the experience replay set based on a method of comparing the qualities of the samples to a threshold value. Various references or policies may be applicable to an example of selecting the sample from the experience replay set based on the quality of the sample according to design intent. The quality of the sample may be defined based on a parameter indicating a degree of usefulness for training. A highest quality or a best quality indicates that a value of a quality is greatest. A quantitative value or a parameter indicating a quality may be designed in various ways according to design intent. For example, a quality of a speech sample recorded in a environment, for example, an environment in which references related to noise and sound quality are controlled in advance, is greater than a quality of a randomly collected speech sample. When the quality is defined based on the distribution of triphones, a quality of a speech sample corresponding to triphones uniformly distributed based on a reference may be greater than the quality of the randomly selected speech sample.

In an example, the qualities of the samples used for training are stored in advance or updated by the training apparatus in a training process. For example, the training apparatus records the qualities of the samples included in the experience replay set in a table or use the qualities of the samples included in the experience replay set to build a database. The training apparatus may update the qualities of the samples included in the experience replay set by performing iterations, and select at least one sample from the experience replay set based on the updated qualities. In an example, the training apparatus provides the experience replay set using samples having relatively high qualities among the samples, and enhances performance associated with a training speed and an accuracy in training by regularly or irregularly performing the experience replay iteration performed using the experience replay set. A condition, a function, or a reference used to define a quality of a sample may be designed in various ways, and detailed description of an example of defining a quality is provided with reference to FIGS. 4A through 4C.

In an example, the training apparatus selects a plurality of samples by applying above-described methods in response to the experience replay iteration corresponding to the current iteration being performed using the batch scheme. The training apparatus may randomly select the samples from the experience replay set. For example, the training apparatus performs the SGD scheme using the samples randomly selected from the experience replay set in response to the experience replay iteration corresponding to the current iteration being performed using the SGD scheme.

In an example, the training apparatus randomly selects the samples at a ratio from the experience replay set and the training set when the experience replay iteration corresponding to the current iteration is performed using the batch scheme. For example, the training apparatus randomly selects samples at an M-to-N ratio from the experience replay set and the training set when the experience replay iteration corresponding to the current iteration is performed using the SGD scheme. In an example, the M-to-N ratio is defined based on one or more of an iteration number of the current iteration, a number of the samples included in the experience replay set, a number of the samples included in the training set, training errors of previous iterations, and the qualities of the samples. However, a method of defining the ratio is not limited thereto. The method of defining the ratio may be modified in various ways according to design intent.

In an example, the training apparatus selects, from the experience replay set, samples similar to the samples selected from the training set when the experience replay iteration corresponding to the current iteration is performed using the batch scheme. For example, the training apparatus randomly selects a plurality of first samples from the training set in response to the experience replay iteration corresponding to the current iteration being performed using the SGD scheme. The training apparatus selects a plurality of second samples having greatest similarities with the first samples, the second samples being randomly selected from the experience replay set. The training apparatus selects each second sample having a greatest similarity with each of the first samples from the experience replay set. In an example, the training apparatus selects the second samples having the greatest similarities with the first samples from the experience replay set based on a distribution of samples classified based on the distribution of triphones.

In an example, the training apparatus selects the plurality of samples from the experience replay set based on the qualities of the samples included in the experience replay set in response to the experience replay iteration corresponding to the current iteration being performed using the batch scheme. For example, the training apparatus selects the samples in an order of high quality from among the samples included in the experience replay set in response to the experience replay iteration corresponding to the current iteration being performed using the SGD scheme. The training apparatus may select samples satisfying a preset reference among the samples included in the experience replay set, or select the samples from the experience replay set by comparing the qualities of the samples to the threshold value.

In operation 304, the training apparatus selects at least one sample from the training set when the current iteration is not performed by the experience replay iteration. The training apparatus may select a plurality of samples from the training set when the current iteration not corresponding to the experience replay iteration is performed using the batch scheme.

In operation 305, the training apparatus updates weights of the neural network using a sample selected from at least one of the experience replay set and the training set. As described above, the training apparatus may update the weights using a backpropagation scheme and the SGD scheme.

In operation 306, the training apparatus determines whether the experience replay set is to be updated based on a result of the training and the at least one selected sample. In an example, the training apparatus determines whether the at least one sample used for the current iteration is to be added to the experience replay set or whether at least one of the samples included in the experience replay set is to be replaced with the at least one sample used for the current iteration. For example, the training apparatus determines whether the experience replay set is to be updated based on the quality of the sample used for the current iteration. The training apparatus may calculate the quality of the sample used for the current iteration, and determine whether the experience replay set is to be updated by comparing the calculated quality to the qualities of the samples included in the experience replay set.

The training apparatus calculates a quality of the sample selected from the current iteration based on any one or any combination of a probability of the sample selected from the current iteration in a distribution of the samples included in the experience replay set, at least one output obtained from the neural network trained based on the sample selected from the current iteration, a training error reduction corresponding to the current iteration, and a difference between a training error reduction corresponding to a previous iteration of the current iteration and the training error reduction corresponding to the current iteration. Information on the samples included in the experience replay set may be stored in a table as shown in Table 1, and the training apparatus may obtain the information on the samples included in the experience replay set from a database or a memory.

TABLE 1

| Sample | $S_1$ | $S_2$ | $S_3$ | $S_4$ | ... | $S_N$ |
|---|---|---|---|---|---|---|
| Quality | $Q_1$ | $Q_2$ | $Q_3$ | $Q_4$ | ... | $Q_N$ |
| Label | $L_1$ | $L_2$ | $L_3$ | $L_4$ | ... | $L_N$ |
| Probability of distribution of samples | $P_1$ | $P_2$ | $P_3$ | $P_4$ | ... | $P_N$ |
| Training error reduction | $R_1$ | $R_2$ | $R_3$ | $R_4$ | ... | $R_N$ |
| Difference in training error reductions | $D_1$ | $D_2$ | $D_3$ | $D_4$ | ... | $D_N$ |
| Output of neural network | $O_1$ | $O_2$ | $O_3$ | $O_4$ | ... | $O_N$ |

Referring to Table 1, the experience replay set includes samples $S_1$ through $S_N$. The samples $S_1$ through $S_N$ are mapped to a label, a probability of distribution of samples, a training error reduction, a difference in training error reductions, and an output of the neural network such that the samples $S_1$ through $S_N$ are provided in a form of a database. In an example, a quality may be quantified and defined based on at least one of the probability of the distribution of samples, the training error reductions, the difference in the training error reductions, and the output of the neural network.

In an example, the training apparatus calculates a probability of a sample selected from the current iteration in a distribution of the samples included in the experience replay set, and calculates a quality of the sample selected from the current iteration based on the calculated probability. The distribution of the samples may be understood as a degree of a distribution of a number of samples belonging to each of groups generated based on a result of classifying the samples based on a reference, for example, a similarity. For example, a probability of a sample is calculated based on a value obtained by dividing a number of samples in a group including the sample by a number of all samples.

Figure 4A:
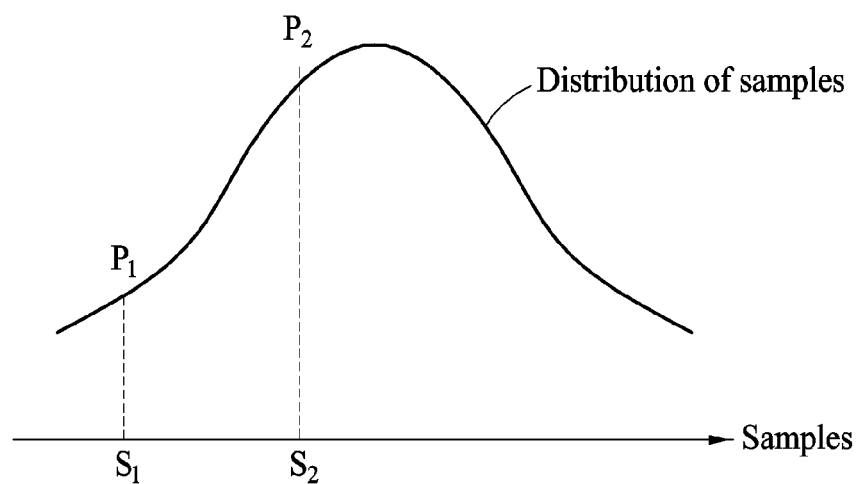
FIG. 4A illustrates an example of an experience replay set.

Referring to FIG. 4A, a distribution of samples may be a normal distribution. In the normal distribution, a probability of a sample $S_1$ is $P_1$ and a probability of a sample $S_2$ is $P_2$. The distribution of the samples may be a distribution indicating a result of classifying the samples based on a distribution of triphones or similarity. The training apparatus calculates a quality of the sample $S_1$ based on the probability $P_1$, and calculates a quality of the sample $S_2$ based on the probability $P_2$. In an example, the training apparatus calculates the quality of the sample $S_1$ having a relatively low probability to be higher than the quality of the sample $S_2$. The training apparatus may compare the probability, for example, a probability in a distribution of samples included in an experience replay set, of a sample selected from a current iteration to probabilities of samples included in the experience replay set, and determine whether the experience replay set is to be updated based on a result of the comparing. For example, when a highest probability among the probabilities of the samples included in the experience replay set is higher than the probability of the sample selected from the current iteration, the training apparatus adds the sample selected from the current iteration to the experience replay set, and excludes a sample corresponding to the highest probability from the experience replay set. The training apparatus may exclude a relatively greatly distributed sample from the experience replay set and include a relatively less distributed sample in the experience replay set based on the probability of the samples.

Figure 4B:
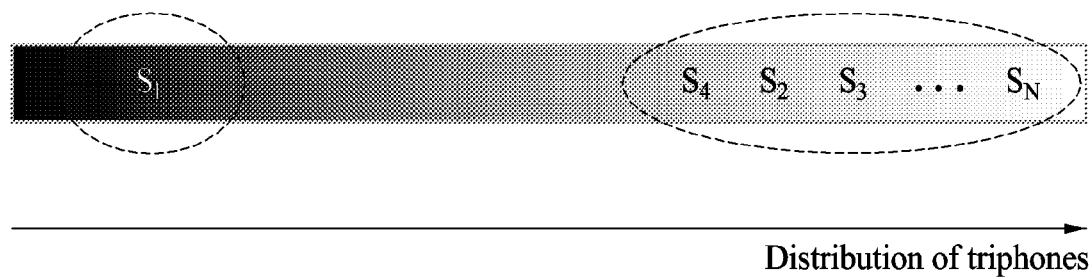
FIG. 4B illustrates an example of an experience replay set.

Referring to FIG. 4B, samples $S_1$ through $S_N$ may be arranged or classified based on a distribution of triphones. In an example, the training apparatus calculates a quality of the sample $S_1$ to be relatively greater than qualities of the samples $S_2$ through $S_N$ because a probability of the sample $S_1$ is less than probabilities of the samples $S_2$ through $S_N$. Shading illustrated in FIG. 4B indicates visual representation for identifying samples based on the distribution of triphones. The training apparatus updates an experience replay set based on a distribution of samples, and thus, samples included in the experience replay set may be uniformly distributed by performing iterations. In an example, the training apparatus manages the samples $S_1$ through $S_N$ included in the experience replay set and probabilities $P_1$ through $P_N$ corresponding to the samples $S_1$ through $S_N$ in a form of a table as shown in Table 1.

Figure 4C:
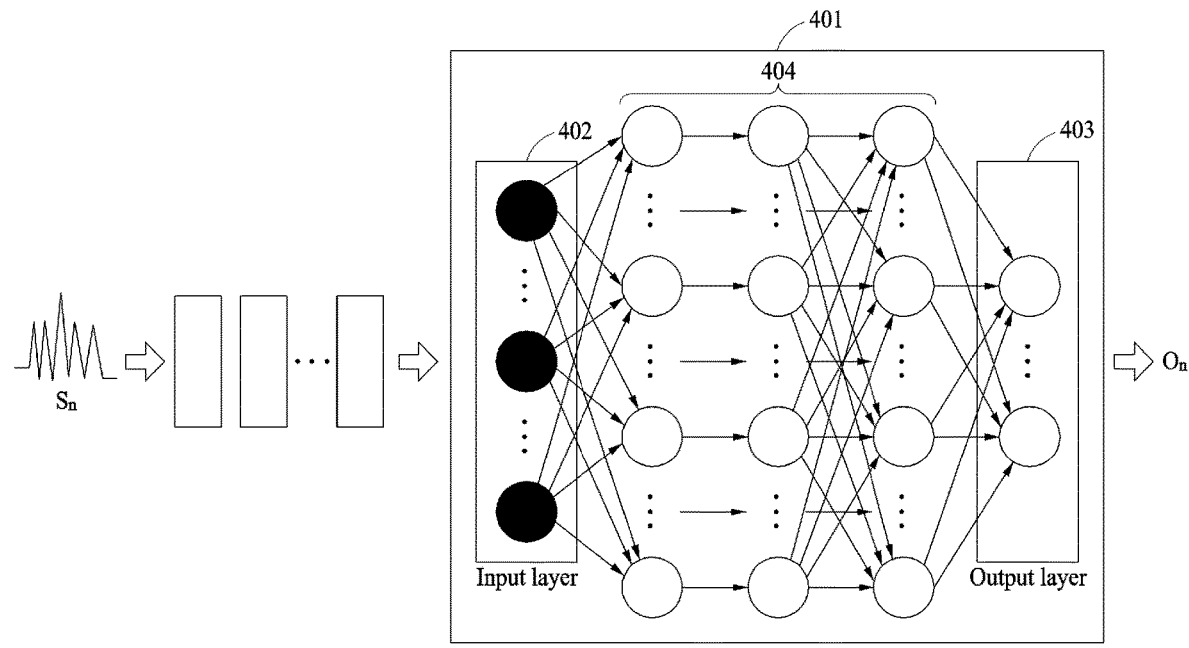
FIG. 4C illustrates an example of an experience replay set.

In an example, the training apparatus trains a neural network using a sample selected from a current iteration, and calculates a quality of the sample selected from the current iteration based on at least one output obtained from the trained neural network. Referring to FIG. 4C, a neural network 401 includes an input layer 402, intermediate layers 404, and an output layer 403. The training apparatus inputs a sample $S_n$ selected from a current iteration to the neural network 401 through the input layer 402, obtains an output On through the output layer 403 of the neural network 401, and trains the neural network 401 based on the output On. When the sample $S_n$ corresponds to a speech sample, the training apparatus may generate a feature of the speech sample using a plurality of frames and train the neural network based on the generated feature. The output On may be defined based on log-likelihood values output from nodes of the output layer 403 and activation functions of the nodes of the output layer 403. In an example, the training apparatus calculates a quality of the sample $S_n$ based on the output On corresponding to the sample $S_n$ selected from the current iteration. For example, the training apparatus calculates the quality of the sample $S_n$ to increase as the output On indicating a value output from the nodes of the output layer 403 decreases. A relatively small output indicates that the neural network recognizes a sample corresponding to the relatively small output with a relatively low recognition rate, or indicates that a number of iterations associated with the sample needs to increase. Thus, the training apparatus sets a quality of the sample corresponding to an output to increase as the output decreases such that the sample is more used for training.

The training apparatus manages outputs $O_1$ through $O_N$ corresponding to the samples $S_1$ through $S_N$ included in the experience replay set in a form of a table as shown in Table 1. The training apparatus compares an output of the sample selected from the current iteration to outputs of the samples included in the experience replay set, and determines whether the experience replay set is to be updated based on a result of the comparing. For example, the training apparatus adds the sample selected from the current iteration to the experience replay set and excludes a sample corresponding to a greatest output from the experience replay set, in response to the greatest output among the outputs of the samples included in the experience replay set being greater than the output of the sample selected from the experience replay set. The training apparatus may exclude a sample having a relatively great output from the experience replay set and include a sample having a relatively small output in the experience replay set based on outputs of the neural network. Thus, the training apparatus may allow the sample having the relatively small output in the neural network to be regularly, irregularly, or iteratively used for training through an experience replay iteration.

In an example, the training apparatus calculates the quality of the sample selected from the current iteration based on a training error reduction corresponding to the current iteration, and manages training error reductions $R_1$ through $R_N$ corresponding to the samples $S_1$ through $S_N$ included in the experience replay set in a form of a table as shown in Table 1. The training apparatus may compare the training error reduction corresponding to the sample selected from the current iteration to training error reductions of the samples included in the experience replay set, and determine whether the experience replay set is to be updated based on the comparision. For example, the training apparatus adds the sample selected from the current iteration to the experience replay set and excludes a sample corresponding to a smallest training error reduction from the experience replay set when the smallest training error reduction among the training error reductions corresponding to the samples included in the experience replay set is less than the training error reduction of the sample selected from the current iteration. The training apparatus may exclude a sample having a relatively small training error reduction from the experience replay set and include a sample having a relatively great training error reduction in the experience replay set based on the training error reductions. Thus, the training apparatus may allow the sample having the relatively great training error reduction to be regularly, irregularly, or iteratively used for training through the experience replay iteration.

In an example, the training apparatus calculates the quality of the sample selected from the current iteration based on a difference in training error reductions. In an example, the difference in the training error reductions includes a difference between the training error reduction corresponding to the current iteration and a training error reduction corresponding to a previous iteration. The training apparatus may manage differences $D_1$ through $D_N$ in training error reductions corresponding to the samples $S_1$ through $S_N$ included in the experience replay set in a form of a table as shown in Table 1. The training apparatus may compare a difference corresponding to the sample selected from the current iteration to differences corresponding to the samples included in the experience replay set, and determine whether the experience replay set is to be updated based on a result of the comparing. For example, the training apparatus adds the sample selected from the current iteration and excludes a sample corresponding to a smallest difference when the smallest difference among the differences corresponding to the samples included in the experience replay set is less than the difference corresponding to the sample selected from the current iteration. The training apparatus may exclude a sample having a relatively small difference from the experience replay set and include a sample having a relatively greater difference in the experience replay set based on the difference in the training error reductions. Thus, the training apparatus may allow the sample having the relatively greater difference in the training error reductions to be regularly, irregularly, or iteratively used for training through the experience replay iteration. A method of defining a quality of a sample is not limited to above-described references. The above-described methods may be used to define a quality of a batch being a set of samples.

Referring back to FIG. 3, in operation 307, the training apparatus updates the experience replay set using the sample selected from the current iteration. In an example, the training apparatus compares the quality of the sample selected from the current iteration to the qualities of the samples included in the experience replay set. The training apparatus may replace at least one sample corresponding to a quality lower than the quality of the sample selected from the current iteration among the samples included in the experience replay set with the sample selected from the current iteration based on the comparison.

In an example, the training apparatus compares the quality of the sample selected from the current iteration to a threshold value. The training apparatus may add the sample selected from the current iteration to the experience replay set based on the comparision. For example, the threshold value being a reference used to compare the threshold value to the quality may decrease as an iteration number corresponding to the current iteration increases in response to the quality of the sample being calculated based on the difference in the training error reductions. The threshold value being the reference used to compare the threshold value to the quality may increase as the iteration number corresponding to the current iteration increases in response to the quality of the sample being calculated based on the output of the neural network. In an example, the training apparatus compares the qualities of the samples included in the experience replay set to the threshold value, and excludes at least one of the samples included in the experience replay set from the experience replay set based on the comparision. The training apparatus may use a quality of a sample by employing various schemes and methods without limiting an operation of updating the experience replay set using the sample selected from the current iteration to the above-described method.

In operation 308, the training apparatus completes an update of the experience replay set or terminates the k-th iteration based on a result of determining that the experience replay set is not to be updated. The training apparatus may determine whether to terminate the training of the neural network or to initiate the (k+1)-th iteration based on at least one of a training error corresponding to the k-th iteration, a training error reduction, and a difference in training error reductions after the k-th iteration terminates.

Figure 5:
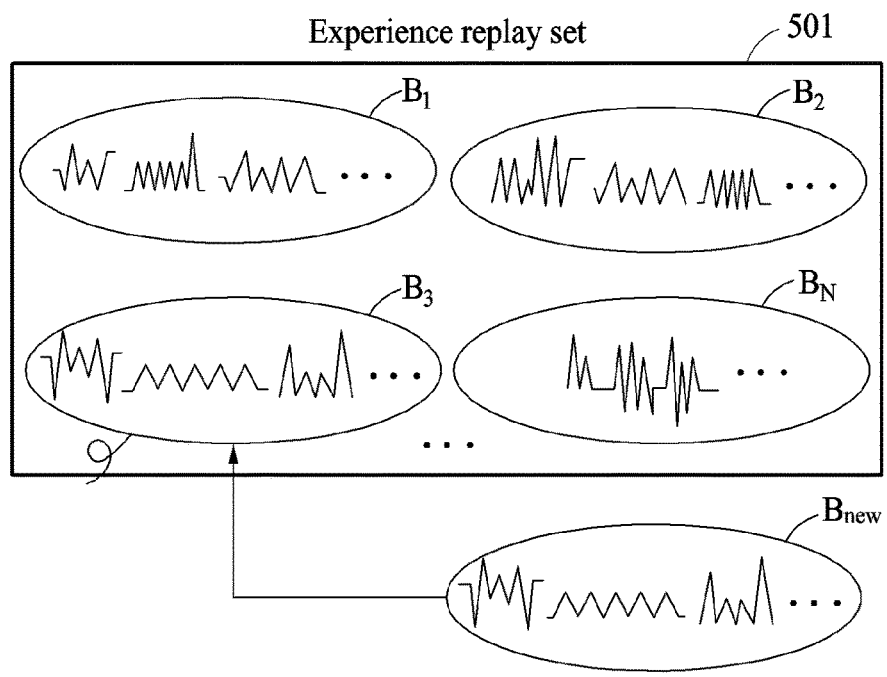
FIG. 5 illustrates an example of an experience replay set.

FIG. 5 illustrates an example of an experience replay set.

Referring to FIG. 5, an experience replay set 501 includes a plurality of batches $B_1$ through $B_N$. A training apparatus may manage the batches $B_1$ through $B_N$ included in the experience replay set 501 and qualities corresponding to the batches $B_1$ through $B_N$ in a form of a table as described above. In an example, the training apparatus constructs and updates the experience replay set 501 by adopting the above-described examples. For example, the training apparatus updates the experience replay set 501 in a batch unit, and replaces the batch $B_3$ included in the experience replay set 501 with a batch $B_{new}$ based on a quality corresponding to a batch.

Figure 6:
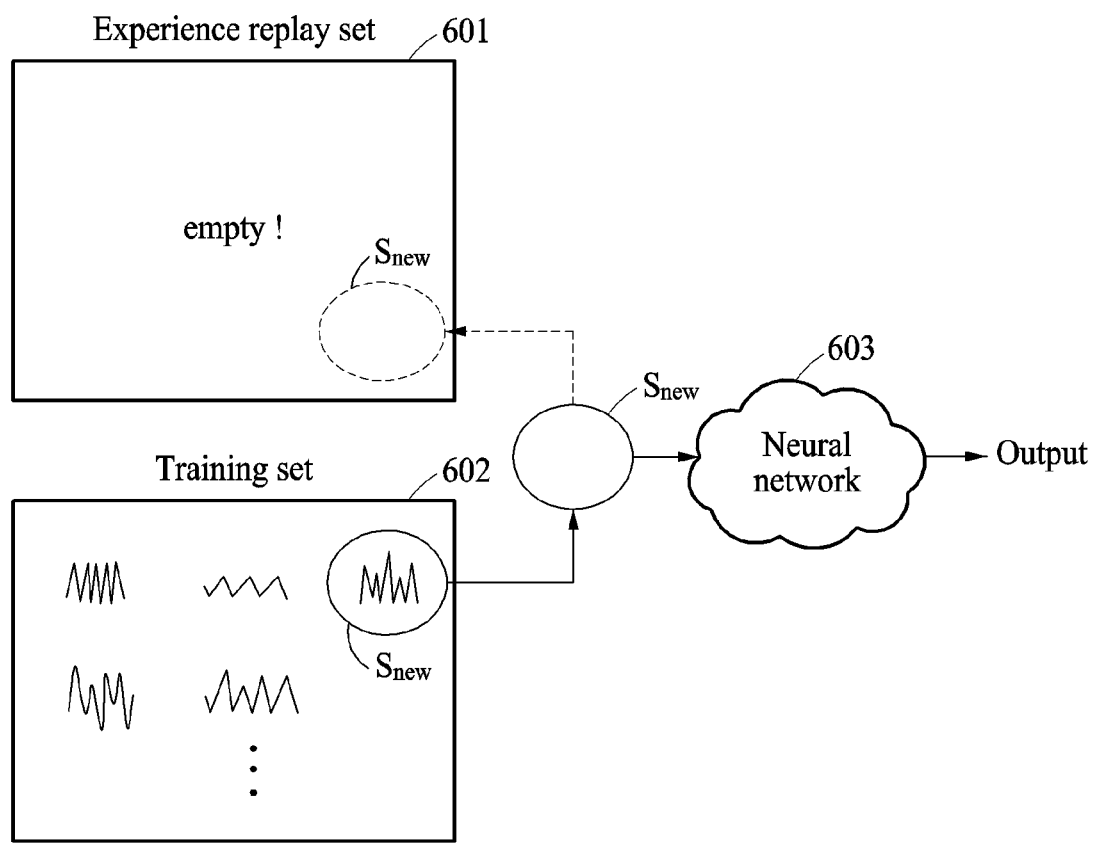
FIG. 6 illustrates an example of an experience replay set.

FIG. 6 illustrates an example of an experience replay set.

Referring to FIG. 6, a training apparatus may not include a sample in an experience replay set 601 before training of a neural network 603 is initiated. For example, in FIG. 6, the training apparatus shows that the experience replay set 601 is empty, initiates training of the neural network 603, and updates the experience replay set 601 when performing the iterations for training. The above-described examples are applied to the operation of updating the experience replay set 601. The training apparatus selects a sample $S_{new}$ from a training set 602 when an initial iteration among the iterations for training is performed, trains the neural network 603 using the selected sample $S_{new}$, and calculates a quality of the sample $S_{new}$ based on an output of the neural network 603. The training apparatus may add the sample $S_{new}$ to the experience replay set 601 based on the quality of the sample $S_{new}$.

Although the experience replay set 601 is initially empty in FIG. 6, the experience replay set 601 may initially include samples satisfying a condition. As described above, the experience replay set 601 may include a set of samples determined to be useful for training. In an example, the training apparatus maintains the experience replay set 601 with a set of a number of samples. For example, the training apparatus maintains a number of samples included in the experience replay set 601 to be N in a process of performing iterations. The training apparatus may record qualities of N samples in the process of performing the iterations for training, and update the experience replay set 601 based on qualities of samples and a quality of a sample selected from a current iteration. In an example, the training apparatus adaptively updates the number of samples included in the experience replay set 601 in the process of performing the iterations for training. The training apparatus may update the number of samples based on at least one of a quality, a distribution of samples, a training error, a training error reduction, a difference in training error reductions, and an output of a neural network.

Figure 7:
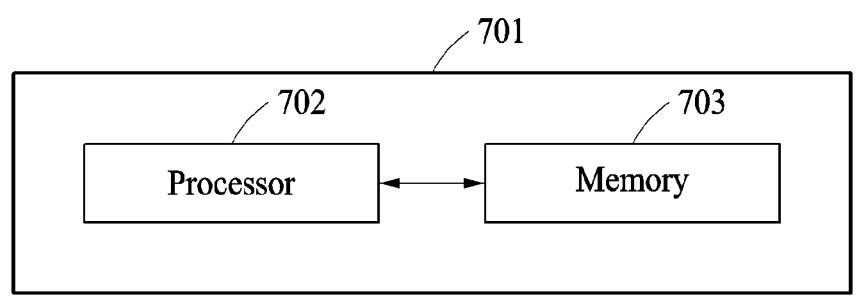
FIG. 7 is a diagram illustrating an example of a training apparatus.

FIG. 7 is a diagram illustrating an example of a training apparatus.

Referring to FIG. 7, a training apparatus 701 includes a processor 702 and a memory 703. The processor 702 includes at least one of apparatuses described above with reference to FIGS. 1 through 6, or performs at least one of methods described above with reference to FIGS. 1 through 6. The memory 703 stores information associated with samples or a program in which a training method is implemented. The memory 703 may be a volatile memory or a non-volatile memory as described below.

The processor 702 executes a program and controls the training apparatus 701. A program code to be executable by the processor 702 is stored in the memory 703. The training apparatus 701 is connected to an external device, for example, a personal computer or a network, through an input and output device (not shown), thereby performing a data exchange.

The training apparatus, and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD).

The methods illustrated in FIGS. 1 and 3 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A machine learning method of a speech recognition neural network, the method comprising:
   determining whether a current iteration for training the neural network, subsequent to a prior training iteration of the neural network, is performed by an experience replay iteration using an experience replay set or a training set;
   selecting a sample from at least one of the experience replay set or the training set based on a result of the determining;
   training the speech recognition neural network based on the selected sample;
   calculating a quality of the selected sample based on a difference between a training error reduction corresponding to the iteration prior to the current iteration and a training error reduction corresponding to the current iteration;
   comparing the calculated quality to qualities of the samples in the experience replay set; and
   determining whether to update the experience replay set based on a result of the comparing.

2. The method of claim 1, wherein the determining comprises determining whether an iteration number corresponding to the current iteration is a multiple of a first number.

3. The method of claim 1, wherein the determining comprises determining whether an iteration number corresponding to the current iteration is less than a sum of a multiple of a first number and a second number.

4. The method of claim 1, wherein the determining comprises determining whether to the training error reduction corresponding to the iteration prior to the current iteration is less than or equal to a threshold.

5. The method of claim 1, wherein the determining comprises determining whether the current iteration is performed using a batch scheme.

6. The method of claim 1, wherein the selecting comprises randomly selecting the sample from the experience replay set in response to the current iteration being performed by the experience replay iteration.

7. The method of claim 1, wherein the selecting comprises:
   randomly selecting a first sample from the training set in response to the current iteration being performed by the experience replay iteration; and
   selecting a second sample having a greatest similarity with the randomly selected first sample from the experience replay set.

8. The method of claim 7, wherein the similarity is defined based on a distribution of triphones of a speech sample.

9. The method of claim 1, wherein the selecting comprises selecting a sample from the experience replay set based on qualities of samples in the experience replay set in response to the current iteration being performed by the experience replay iteration.

10. The method of claim 1, wherein the selecting comprises randomly selecting samples from the experience replay set in response to the current iteration being performed by the experience replay iteration and the experience replay iteration being performed using a batch scheme.

11. The method of claim 1, wherein the selecting comprises randomly selecting samples at a ratio from the experience replay set and the training set in response to the current iteration being performed by the experience replay iteration and the experience replay iteration being performed using a batch scheme.

12. The method of claim 1, wherein the selecting comprises:
   randomly selecting first samples from the training set in response to the current iteration being performed by the experience replay iteration and the experience replay iteration being performed using a batch scheme; and
   selecting second samples having greatest similarities with the randomly selected first samples from the experience replay set.

13. The method of claim 1, wherein the selecting comprises selecting samples from the experience replay set based on qualities of samples in the experience replay set, in response to the current iteration being performed by the experience replay iteration and the experience replay iteration being performed using a batch scheme.

14. The method of claim 1, further comprising:
   determining whether to update the experience replay set based on a result of the training and the comparing.

15. The method of claim 14, wherein the determining of whether to update the experience replay further comprises calculating a quality of the selected sample based any one or any combination of:
   a probability of the selected sample in a distribution of samples included in the experience replay set;
   an output obtained from the neural network trained based on the selected sample; and
   a training error reduction corresponding to the current iteration.

16. The method of claim 15, wherein the determining of whether the experience replay set is to be updated further comprises comparing the calculated quality to a threshold value.

17. The method of claim 16, further comprising:
   adding the selected sample to the experience replay set based on a result of the comparing.

18. The method of claim 16, wherein the threshold value decreases as an iteration number of the current iteration increases, in response to the quality being calculated based on the difference.

19. The method of claim 16, wherein the threshold value increases as an iteration number of the current iteration increases, in response to the quality being calculated based on the output.

20. The method of claim 1, further comprising:
   replacing at least one sample of the experience replay set corresponding to a quality lower than the calculated quality with the selected sample based on a result of the comparing.

21. The method of claim 1, wherein the experience replay set comprises at least one of speech samples recorded in an environment or speech samples corresponding to triphones uniformly distributed based on a reference.

22. A non-transitory computer-readable medium storing instructions that, when executed by a processor, cause the processor to perform the method of claim 1.

23. A machine learning method of a speech recognition neural network, the method comprising:
   training the speech recognition neural network based on a sample selected from at least one of an experience replay set or a training set for a current iteration for training the neural network;
   calculating a quality of the selected sample based on a difference between a training error reduction corresponding to an iteration prior to the current iteration and a training error reduction corresponding to the current iteration;
   comparing the calculated quality to qualities of the samples in the experience replay set;
   determining whether to update the experience replay set based on a result of the training and the comparing; and
   updating the experience replay set based on a result of the determining.

24. The method of claim 23, wherein the determining of whether to update the experience replay set comprises calculating a quality of the selected sample based on any one or any combination of:
   a probability of the selected sample in a distribution of samples included in the experience replay set;
   an output obtained from the neural network trained based on the selected sample; and
   a training error reduction corresponding to the current iteration.

25. The method of claim 24, wherein the updating further comprises replacing at least one sample corresponding to a quality lower than the calculated quality with the selected sample based on a result of the comparing.

26. The method of claim 24, wherein the determining further comprises comparing the calculated quality to a threshold value, and the updating further comprises adding the selected sample to the experience replay set based on a result of the comparing.

27. The method of claim 26, wherein the threshold value decreases as an iteration number of the current iteration increases, in response to the quality being calculated based on the difference.

28. The method of claim 26, wherein the threshold value increases as an iteration number of the current iteration increases, in response to the quality being calculated based on the output.

29. The method of claim 23, wherein the training comprises determining whether the current iteration is performed by an experience replay iteration using the experience replay set.

30. A machine learning apparatus for a speech recognition neural network comprising:

a processor;

a memory configured to store an instruction readable by the processor, wherein, when the instruction is executed by the processor, the processor is configured to:

determine whether a current iteration for training the neural network, subsequent to a prior training iteration of the neural network, is performed by an experience replay iteration using an experience replay set or a training set;

select a sample from at least one of the experience replay set or the training set based on a result of the determining;

train the speech recognition neural network based on the selected sample;

calculate a quality of the selected sample based on a difference between a training error reduction corresponding to the iteration prior to the current iteration and a training error reduction corresponding to the current iteration;

compare the calculated quality to qualities of the samples in the experience replay set; and determine whether to update the experience replay set based on a result of the comparing.

31. A machine learning apparatus for a speech recognition neural network comprising:

a processor;

a memory configured to store an instruction readable by the processor, wherein, when the instruction is executed by the processor, the processor is configured to:

train the speech recognition neural network based on a sample selected from at least one of an experience replay set or a training set in association with a current iteration for training the neural network;

calculate a quality of the selected sample based on a difference between a training error reduction corresponding to an iteration prior to the current iteration and a training error reduction corresponding to the current iteration;

compare the calculated quality to qualities of the samples in the experience replay set;

determine whether to update the experience replay set based on a result of the training and the comparing; and update the experience replay set based on a result of the determining.

* * * * *